US006259758B1

(12) United States Patent
Kim et al.

(10) Patent No.: US 6,259,758 B1
(45) Date of Patent: *Jul. 10, 2001

(54) CATALYTIC HYDROGEN PEROXIDE DECOMPOSER IN WATER-COOLED REACTORS

(75) Inventors: Young Jin Kim, Clifton Park, NY (US); Leonard William Niedrach, deceased, late of Moorestown, NJ (US), Alice M. Miedrach, legal representative; George Charles Sogoian, Glenville, NY (US); Robert Lee Cowan, II, Livermore, CA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,645

(22) Filed: Feb. 26, 1999

(51) Int. Cl.[7] .................................................. G21C 9/00
(52) U.S. Cl. ......................... 376/305; 376/306; 376/414; 376/417
(58) Field of Search ................................. 376/305, 306, 376/414, 417, 900

(56) References Cited

U.S. PATENT DOCUMENTS 4,035,182   7/1977   Kowaka et al. .
4,040,876   8/1977   Bleiberg et al. .

(List continued on next page.)

FOREIGN PATENT DOCUMENTS

| 669974  | * | 9/1963  | (CA) | ..................................... 252/70 |
| 0022098 | * | 2/1979  | (JP) | ................................ G21C/3/06 |
| 0143485 | * | 11/1980 | (JP) | ................................ G21C/3/06 |
| 0143486 | * | 11/1980 | (JP) | ................................ G21C/3/06 |

*Primary Examiner*—Michael J. Carone
*Assistant Examiner*—John Richardson
(74) *Attorney, Agent, or Firm*—Noreen C. Johnson; Douglas E. Stoner (57) ABSTRACT

A metal cooling tube of a water-cooled nuclear reactor, having an inner surface thereof exposed to an aqueous cooling medium containing hydrogen peroxide. The cooling tube has its inner surface coated with matter selected from the group consisting of the element manganese, molybdenum, zinc, copper, cadmium for absorbing such hydrogen peroxide and then affecting decomposition of the hydrogen peroxide in the aqueous medium. In preferred embodiment such coating is manganese and oxides thereof. A method for lowering the electrochemical corrosion potential of a metal allow cooling tube exposed to an aqueous medium in a water-cooled nuclear reactor is also disclosed. Such method comprises the step of coating an inner surface of such tube with matter selected from the group of elements comprising manganese, molybdenum, zinc, copper, cadmium, so as to permit absorption and hydrogen peroxide in such aqueous medium and effect decomposition of hydrogen peroxide in such aqueous medium.

12 Claims, 5 Drawing Sheets

U.S. PATENT DOCUMENTS

| | | |
|---|---|---|
| 4,072,509 | 2/1978 | Zorev et al. . |
| 4,162,930 | 7/1979 | Abe et al. . |
| 4,183,774 | 1/1980 | Balleret . |
| 4,201,574 | 5/1980 | Kowaka et al. . |
| 4,214,950 | 7/1980 | Balandin et al. . |
| 4,248,629 * | 2/1981 | Pons et al. .............................. 75/122 |
| 4,302,248 | 11/1981 | Kasamatsu et al. . |
| 4,343,659 * | 8/1982 | Murakami et al. ................... 148/6.3 |
| 4,576,641 | 3/1986 | Bates et al. . |
| 4,610,842 * | 9/1986 | Vannesjo ............................... 376/416 |
| 4,836,976 | 6/1989 | Jacobs . |
| 5,026,517 * | 6/1991 | Menken et al. ...................... 376/438 |
| 5,073,336 * | 12/1991 | Taylor .................................. 376/457 |
| 5,116,569 | 5/1992 | Kasahara et al. . |
| 5,147,602 | 9/1992 | Andresen et al. . |
| 5,227,129 * | 7/1993 | Bryan et al. .......................... 376/414 |
| 5,278,881 | 1/1994 | Kato et al. . |
| 5,280,510 * | 1/1994 | Bryan ................................... 376/414 |
| 5,285,486 | 2/1994 | Cowan, II et al. . |
| 5,287,392 | 2/1994 | Cowan, II et al. . |
| 5,392,325 | 2/1995 | Gordon et al. . |
| 5,465,281 * | 11/1995 | Andresen et al. .................... 376/305 |
| 5,539,794 | 7/1996 | Jacobs et al. . |
| 5,555,280 * | 9/1996 | Cartry .................................. 376/260 |
| 5,583,900 | 12/1996 | Kasahara et al. . |
| 5,727,368 | 3/1998 | Wernimont et al. . |
| 5,741,596 | 4/1998 | Skowronski et al. . |
| 5,774,516 * | 6/1998 | Hettiarachchi et al. ............. 376/305 |
| 5,792,090 | 8/1998 | Ladin . |
| 5,793,830 * | 8/1998 | Kim et al. ............................ 376/305 |

* cited by examiner

CATALYTIC HYDROGEN PEROXIDE DECOMPOSER IN WATER-COOLED REACTORS

BACKGROUND OF THE INVENTION

The present invention is directed to hydrogen peroxide decomposer for use in water-cooled nuclear reactors, including boiling water reactors and pressurized water reactors, for the mitigation of corrosion phenomena in such systems.

Steel pressure vessels and piping exposed to high temperature water are prone to corrosion due to oxidation of the various metals therein by oxidizing agents, particularly oxygen, present in the high temperature water. Corrosion of such vessels and piping can lead to a variety of problems, including stress corrosion cracking, crevice corrosion and erosion corrosion, leading to leakage and/or bursting of such vessels and piping.

In nuclear reactors, significant amounts of heat energy is generated by reactor processes occurring in the reactor core. A liquid coolant, typically water, is used to remove heat from the reactor core and facilitate its conversion to a useable form. A reactor vessel is provided to contain the reactor coolant around the reactor core to effect such heat removal. Further, piping is provided to facilitate transport of the coolant to steam generators or turbines, where heat energy is ultimately converted to electricity. The materials used in the construction of nuclear reactor vessels and piping are elected for their ability to withstand rigorous loading, environmental and radiation conditions. Such materials include carbon steel, low alloy steel, stainless steel and nickel-based, cobalt-based and zirconium-based alloys.

Despite careful material selection, corrosion and, particularly, intergranular stress corrosion cracking (or, simply, stress corrosion cracking (SCC)), is a problem in steel pressure vessels and piping used in nuclear reactors. SCC, as used herein, refers to cracking propagated by static or dynamic tensile stressing in combination with corrosion at the crack tip. Unfortunately, the nuclear reactor environment is conducive to both tensile stressing and corrosion.

Nuclear reactor pressure vessels and piping are subject to a variety of stresses. Some are attributable to the high operating pressure required to maintain high temperature water in a liquid state. Stresses also arise due to differences in thermal expansion of the materials of construction. Other sources include residual stresses from welding, cold working, and other metal treatments.

Nuclear reactors are also susceptible to SCC because of the water chemistry environment of its process systems, which is favourably disposed to corrosion. In this respect, the presence of oxidizing agents, such as oxygen, hydrogen peroxide, and various short-lived radicals, which arise from the radiolytic decomposition of high temperature water in boiling water reactors, contribute to SCC.

Hydrogen peroxide is particularly unstable as it has the ability to act as both an oxidizing agent and a reducing agent. Hydrogen peroxide can act as an oxidizing agent, leading to the formation of water according to the following reaction:

$$H_2O_2 + 2H^+ + 2e^- \rightarrow 2H_2O$$

As a reducing agent, hydrogen peroxide is oxidized to oxygen according to the following reaction:

$$H_2O_2 \rightarrow O_2 + 2H^+ + 2e^-$$

Because of its ability to act as both an oxidizing agent and a reducing agent, hydrogen peroxide is highly unstable and will spontaneously decompose into water and oxygen according to the following reaction:

$$2H_2O_2 \rightarrow 2H_2O + O_2$$

This will happen if aqueous hydrogen peroxide contacts a metallic surface whose electrode potential lies within this region of instability, which is typically the case in the BWR environment.

Stress corrosion cracking is of great concern in boiling water reactors (BWR's) which utilize light water as a means of cooling nuclear reactor cores and extracting heat energy produced by such reactor cores. Stress corrosion cracking causes leakage or bursting of such vessels or piping resulting in the loss of coolant in the reactor core. This compromises the reactor process control, which could have dire consequences.

Figure 1:
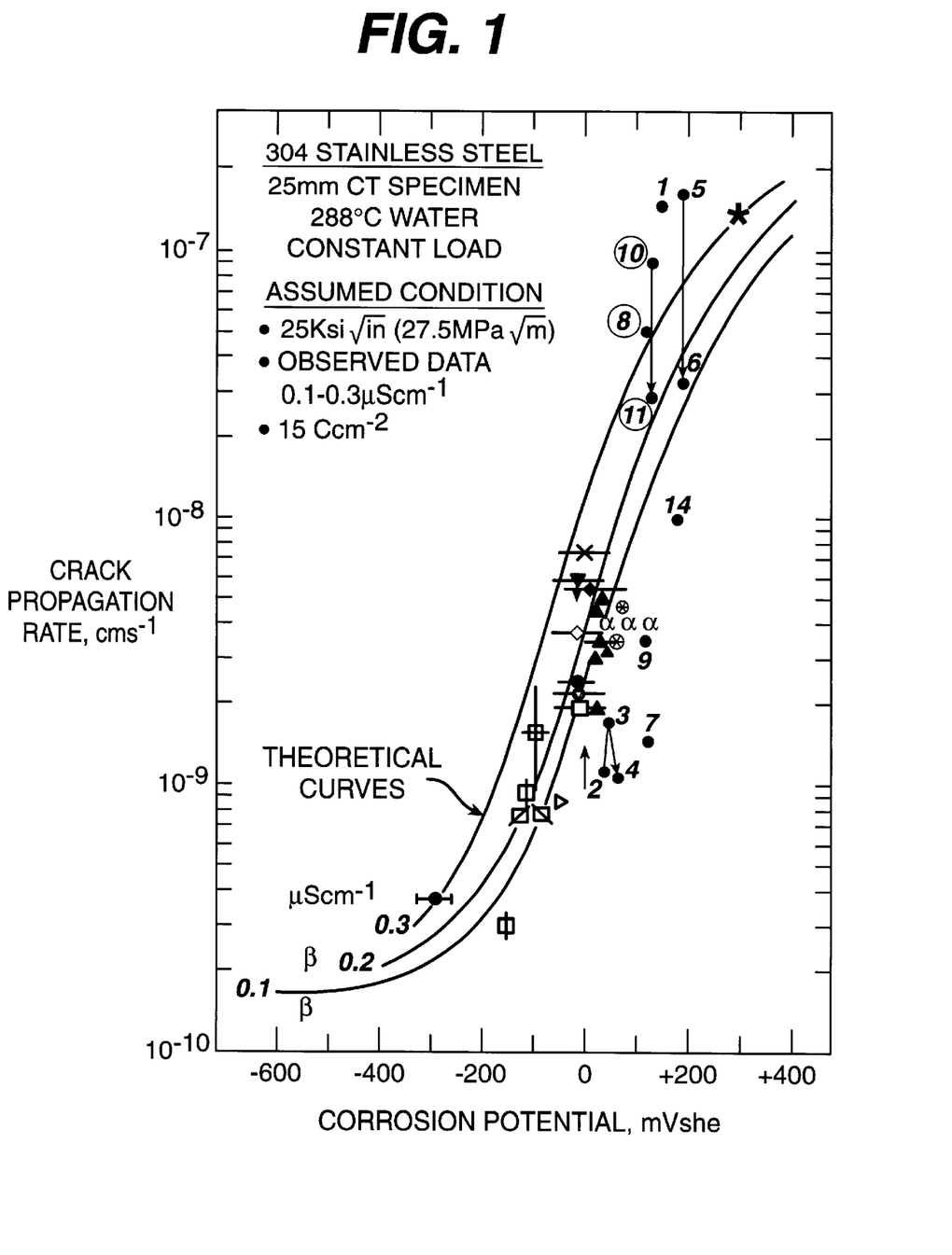
FIG. 1 is a graph illustrating the observed and theoretical crack propagation rate as a function of electrochemical corrosion potential for sensitized 304 stainless steel in 288° C. water under constant load (25 ksi√in)

To mitigate stress corrosion cracking phenomenon in BWR's, it is desirable to reduce the electrochemical corrosion of metal components that are exposed to aqueous fluids. ECP Electrochemical Corrosion Potential is a measure of the thermodynamic tendency for corrosion to occur, and is a fundamental parameter in determining rates of stress corrosion cracking. ECP has been clearly shown to be a primary variable in controlling the susceptibility of metal components to stress corrosion cracking in BWRs. FIG. 1 shows the observed and predicted crack growth rate as a function of ECP for furnace sensitized Type 304 stainless steel at 27.5 MPa in 288° C. water over the range of solution conductivities from 0.1 to 0.3 $\mu S/cm$.

For type 304 stainless steel (containing 18–20% Cr, 8–10.5% Ni, and 2% Mn), it is known that if the ECP of such steel exposed to high temperature water at about 288° C. can be reduced to values below −230 mV (Standard Hydrogen Electrode—SHE) (hereinafter the "critical corrosion potential"), the stress corrosion cracking problem of such steel can be greatly reduced. The same generally applies for other types of steels.

A well-known method to reduce the ECP to less than −230 $mV_{SHE}$ and thereby mitigate SCC of steel pressure vessels and piping in nuclear reactors, is to inject hydrogen gas to the recirculating reactor feedwater. The injected hydrogen gas reduces oxidizing species in the water, such as dissolved oxygen. This has the very desirable benefit of reducing the corrosion potential of the steel vessel or piping carrying such high temperature water.

Figure 2:
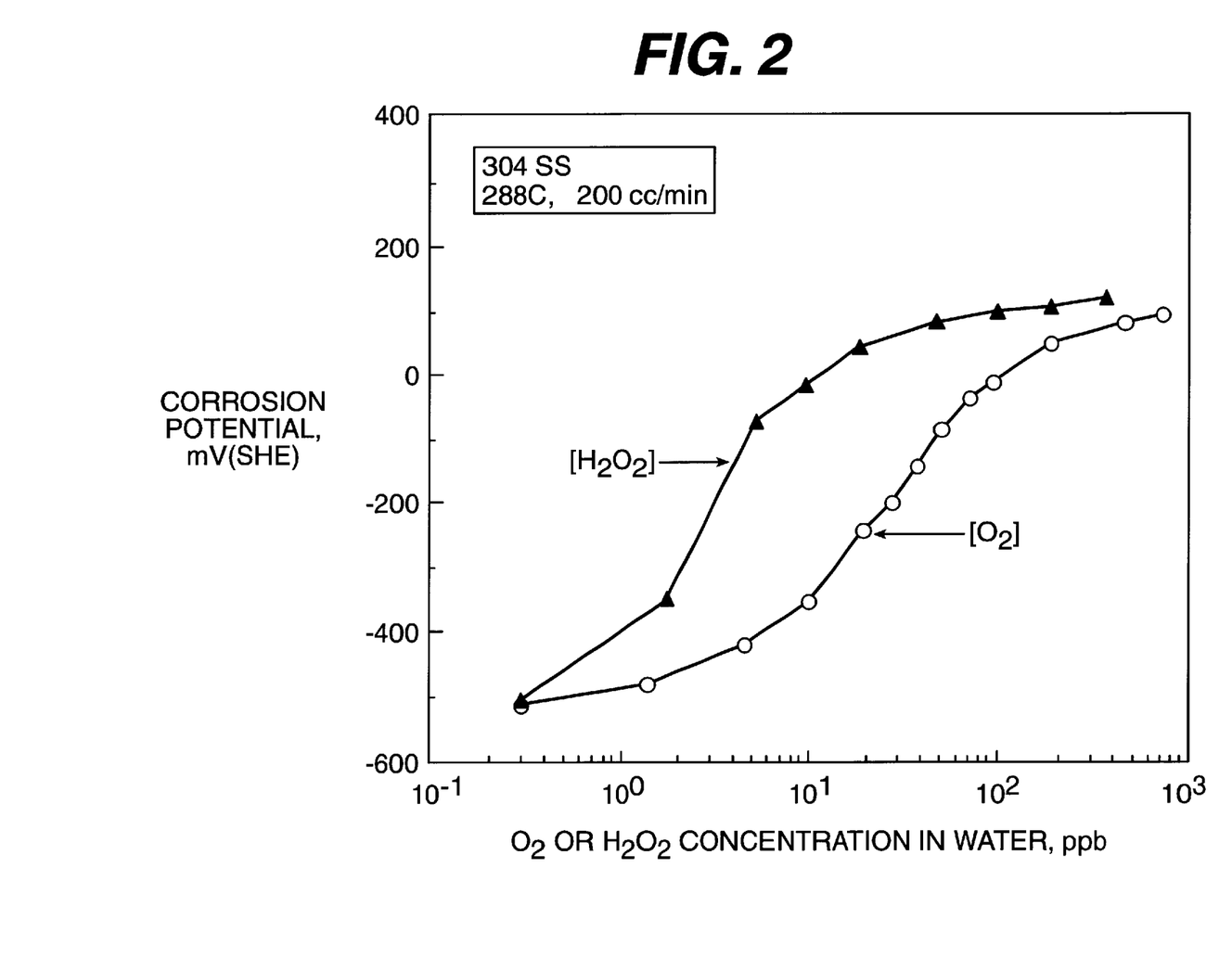
FIG. 2 is a graph illustrating electrochemical corrosion potential for 304 stainless steel in 288° C. water containing various amounts of $H_2O_2$ showing corrosion potential of such 304 stainless steel as a function of the $O_2$ and $H_2O_2$ concentration in water.
Figure 3:
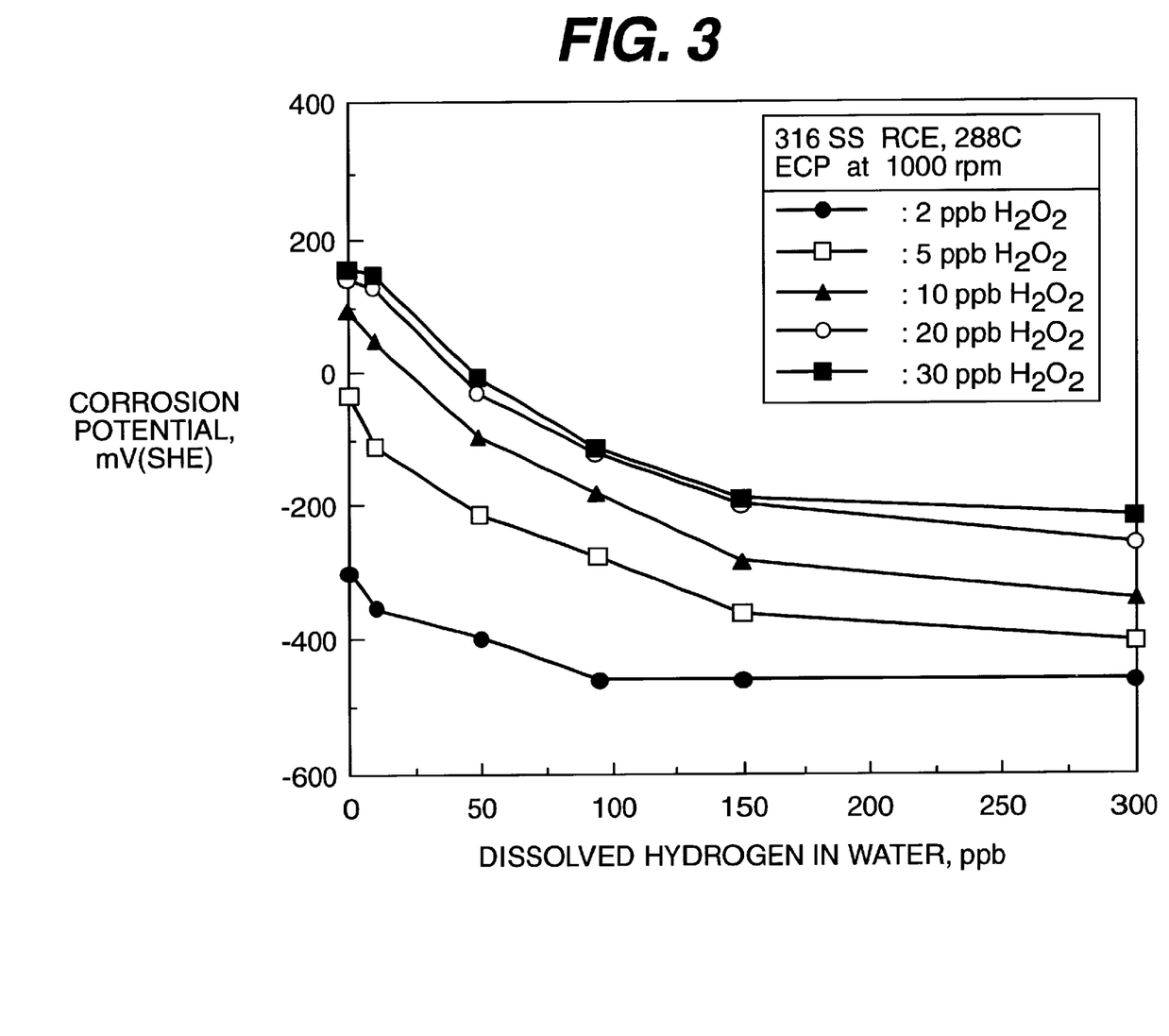
FIG. 3 is a graph illustrating the electrochemical corrosion potential for 316 stainless steel in 288° C. water containing various amounts of $H_2O_2$ showing corrosion potential of such 316 stainless steel in as a function of dissolved $H_2$ concentration in water with varying amounts of hydrogen peroxide.

As illustrated in FIG. 2, ECP of 304SS in 288° C. water increases more rapidly with continued addition of hydrogen peroxide when compared to the ECP values measured at the same levels of oxygen concentration. Further, even with the use of hydrogen gas injection, SCC in BWRs continues to occur at unacceptable rates when hydrogen peroxide is present. This is illustrated in FIG. 3, where stress corrosion cracking is shown to occur in BWRs, even with the addition of hydrogen gas, when 20–30 ppb of hydrogen peroxide is present. This information suggests that the presence of hydrogen peroxide in reactor systems is a significant contributor to stress corrosion cracking of metal components. Moreover, the present practice of injecting hydrogen gas into the process liquid does not appear to completely assist in the decomposition of hydrogen peroxide and therefore does not bring about the concomitant reduction in ECP that is expected.

SUMMARY OF INVENTION

In one broad aspect, the present invention provides a corrosion resistant alloy having a surface exposed to aqueous liquid consisting of oxidizing species, including hydrogen peroxide, that increase the ECP of the alloy. The surface of the alloy is coated with a coating comprised of Mn, Mo, Zn, Cu, Cd, oxides thereof, or chemical compounds thereof. These metals and their compounds assist in causing the decomposition of hydrogen peroxide, thereby reducing the ECP of the alloy. These metals and their compounds can be present as a pre-existing coating on the alloy, or may be deposited in-situ into the aqueous liquid for subsequent deposition on the surface of the alloy after injection.

According to another broad aspect of the present invention there is provided a corrosion resistant alloy cooling tube in a water-cooled nuclear reactor having a surface exposed to an aqueous cooling medium containing hydrogen peroxide, the surface being coated with a coating comprising matter selected from the group consisting of manganese, molybdenum, zinc, copper, cadmium, oxides thereof, chemical compounds thereof and mixtures thereof, for causing decomposition of the hydrogen peroxide.

According to another aspect of the present invention there is provided a water-cooled nuclear reactor comprising metal piping, such metal piping having a surface exposed to an aqueous liquid containing hydrogen peroxide, the surface being coated with a coating comprising matter selected from the group consisting of manganese, molybdenum, zinc, copper, cadmium, oxides thereof, chemical compounds thereof and mixtures thereof, for causing decomposition of the hydrogen peroxide.

According to another aspect of the present invention there is provided a method for lowering the electrochemical corrosion potential of a metal alloy, for use in a cooling tube in a water-cooled nuclear reactor, having a surface exposed to an aqueous liquid containing hydrogen peroxide, comprising the step of coating the surface with matter selected from the group consisting manganese, molybdenum, zinc, copper, cadmium, oxides thereof, chemical compounds thereof and mixtures thereof, for causing decomposition of the hydrogen peroxide.

In a further aspect of the present invention, there is provided a method of lowering the electrochemical corrosion potential of metal alloy cooling tubes in a water-cooled nuclear reactor, the tubes having surfaces exposed to an aqueous liquid containing hydrogen peroxide, comprising the step of injecting matter into said water, said matter selected from the group consisting of manganese, molybdenum, zinc, copper, cadmium, oxides thereof, chemical compounds thereof and mixtures thereof, for causing decomposition of the hydrogen peroxide.

BRIEF DESCRIPTION OF THE DRAWINGS

The method and apparatus of the invention will now be described with reference to the accompanying drawings, in which.

DETAILED DESCRIPTION OF THE PREFERRED EMBODIMENTS

It has been found that, by coating an alloy from the group consisting of carbon steel, alloy steel, stainless steel, nickel-based alloys, zirconium and cobalt-based alloys with a catalytically active material, or otherwise providing catalytic activity at such metal alloy surfaces, the decomposition of the hydrogen peroxide in aqueous process systems of nuclear reactors is catalysed by the catalytically active material. Such catalytic action at the surface of the alloy reduces the ECP of the alloy, thereby mitigating SCC of such alloy. Suitable coatings of catalytically active material can be deposited by methods well known in the art for depositing continuous or substantially continuous coatings on metal substrates, such as plasma spraying, chemical vapour deposition, physical vapour deposition processes such as sputtering, welding such as metal inert gas welding, electroless plating, and electrolytic plating.

The catalytically active material can be a metal selected from the group consisting of manganese, molybdenum, zinc, copper, cadmium and mixtures thereof. Other suitable materials include oxides of these metals. Even further suitable materials can include chemical compounds containing these metals, where the metal in such compounds is able to dissociate and make itself available for reacting with oxygen to form an oxide.

Manganese dioxide catalyzes the decomposition of hydrogen peroxide according to the following reaction mechanism:

It is believed that, by coating the surface of a metal alloy cooling tube of a water-cooled nuclear reactor with manganese, such component is able to maintain a lower ECP. This is because the manganese is believed to be oxidized to catalytically active manganese oxide ($MnO_2$), which catalyses hydrogen perixode decomposition.

Because very small surface concentrations are adequate to provide the necessary catalytic activity and reduce the corrosion potential of the metal, the processing as well as the physical, metallurgical or mechanical properties of the alloys and components formed therefrom are not significantly altered. Further, lower amounts of reducing species, such as hydrogen, are necessary to reduce the ECP of the metal components below the critical potential, because of the catalysed decomposition of hydrogen peroxide.

Figure 4:
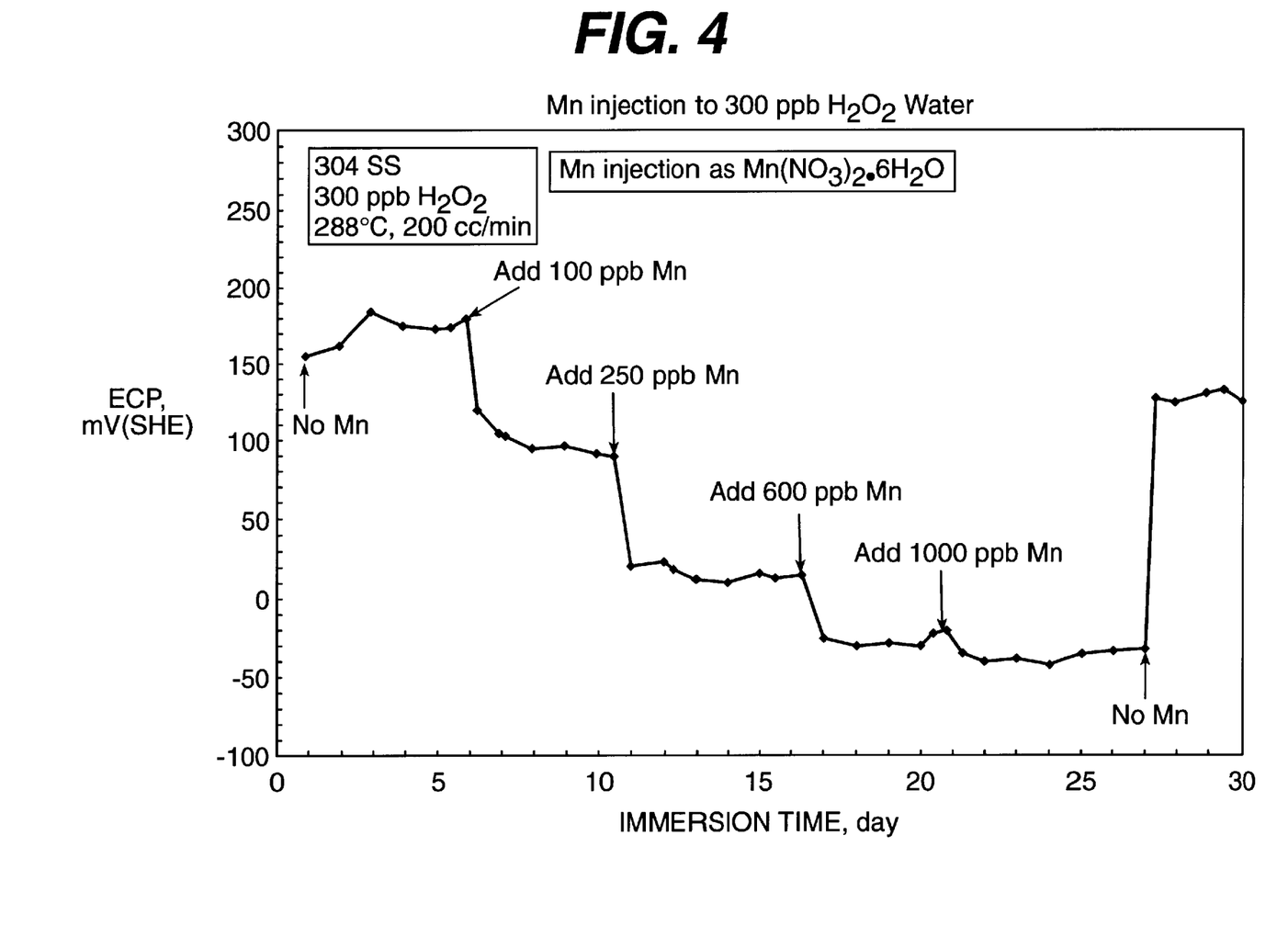
FIG. 4 is a graph illustrating the electrochemical corrosion potential of 304 stainless steel in 288° C. water containing 300 parts per billion hydrogen peroxide with and without in-situ injection of various manganese concentrations as a function of immersion time.

As an alternative to coating the subject alloy with the catalytically active material, the catalytically active material may be injected in-situ in the process liquid for effecting decomposition of hydrogen peroxide, thereby reducing the ECP of the alloy. FIG. 4 shows the benefits of in-situ injection of manganese as $Mn(NO_3)_2 \cdot 6H_2O$ for effecting decomposition of hydrogen peroxide. With each injection, there was a corresponding reduction in ECP of the alloy believed attributable to the decomposition of hydrogen peroxide. It is believed that the injected manganese oxidizes and precipitates out as $MnO_2$ on the alloy surface. Once deposited on the surface, $MnO_2$ effects the catalytic decomposition of hydrogen peroxide according to the above-described reaction mechanism.

The present invention will be described in further detail with reference to the following non-limitative examples.

EXAMPLE 1

A 304 SS electrode was placed in an autoclave recirculating loop, containing water at 288° C. having 300 ppb hydrogen peroxide. Various concentration of dissolved Mn solution were injected directly into the autoclave where the 304 SS electrode was immersed and argon gas was continuously purged through this injection solution during the test. The ECP of the 304 SS electrode was measured over the course of 30 days using a $Cu/Cu_2O/ZrO_2$ electrode. The measured ECP was converted to a standard hydrogen electrode (SHE) scale.

FIG. 4 shows the ECP response of 304 SS electrode before, during, and after three different manganese solution injections to 288° C. water containing 300 ppb hydrogen peroxide. It is evident that the addition of Mn to 300 ppb hydrogen peroxide water decreased the ECP of the 304 SS electrode. Once injections were ceased, the ECP of the 304 SS electrode remained lower than the corrosion potential observed before the injections were commenced. This indicates the possible deposition of manganese oxide on 304 SS oxide, with the concomitant catalytic decomposition of hydrogen peroxide by the deposited manganese. The presence of manganese was, in fact, confirmed by Auger electron spectroscopy, which confirmed a thin oxide layer of 2~4% by weight on the 304 SS surface, to a depth of 100~150 A.

From the above test, the presence of manganese oxide on the metal surfaces enhances the decomposition of hydrogen peroxide, with a consequent decrease in ECP of the metal alloy.

EXAMPLE 2

A 304 SS electrode was placed in an autoclave recirculating loop, containing water at 288° C. having 100 ppb hydrogen peroxide. Zinc, as zinc oxide, was injected directly into the autoclave where the 304 SS electrode was immersed. The ECP of the 304 SS electrose was measured over the course of 25 days using a $Cu/Cu_2O/ZnO_2$ electrode. The measured ECP was converted to a standard hydrogen electrode (SHE) scale.

Figure 5:
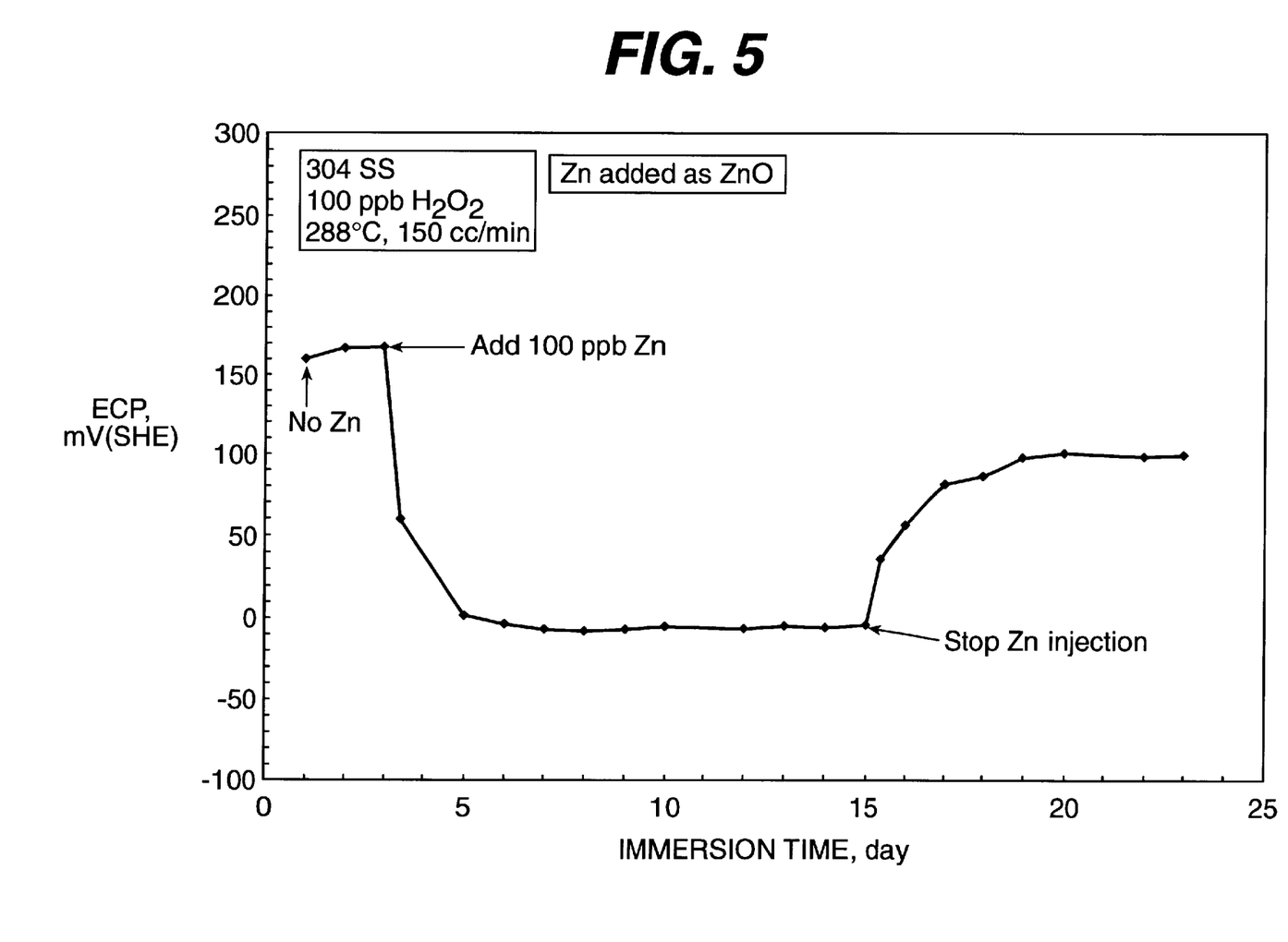
FIG. 5 is a graph illustrating the electrochemical corrosion potential of 304 stainless steel in 288° C. water containing 100 parts per billion hydrogen peroxide with and without in-situ injection of various zinc concentrations as a function of time.

FIG. 5 shows the ECP response of 304 SS electrode before, during and after aqueous zinc oxide injection to 288° C. water containing 100 ppb hydrogen peroxide. Clearly, once injection of the aqueous Zinc oxide began, ECP of the 304 SS became reduced. Once injection was stopped, the ECP of the 304 SS electrode remained lower than the corrosion potential observed before the injections were commenced. This indicates the possible deposition of zinc oxide on 304 SS, with the concomitant decomposition of hydrogen peroxide by the deposited zinc oxide.

The present invention provides a number of important advantages. In particular, the present invention provides a metal alloy surface coated with a catalytically active material for the decomposition of hydrogen peroxide. By doing so, the ECP of such metal alloys is lowered, thereby reducing corrosion and, notably, mitigating the effects of stress corrosion cracking. This is particularly beneficial for components of water-cooled nuclear reactors, whose high temperature aqueous environment is conducive to such corrosion phenomena, and where the occurrences of such phenomena could lead to loss of coolant and consequent loss of reactor control.

It will be understood, of course, that modifications can be made in the embodiments of the invention described herein without departing from the scope and purview of the invention. For a complete definition as to the scope of the invention, reference is to be made to the appended claims.

We claim:

1. A structure material for a cooling tube of a water-cooled nuclear reactor having a surface exposed to an aqueous cooling medium containing hydrogen peroxide, said surface coated with a coating comprising matter selected from the group consisting of manganese, cadmium, oxides thereof, chemical compounds thereof and mixtures thereof, the structure material being sufficient for effecting and causing decomposition of said hydrogen peroxide in said cooling medium.

2. The structure material as claimed in claim 1 wherein said alloy is selected from the group consisting of carbon steel, zirconium, alloy steel, stainless steel, nickel-based alloys, and cobalt-based alloys.

3. The structure material as claimed in claim 1 wherein said matter of said coating is capable of adsorbing said hydrogen peroxide.

4. The structure material as claimed in claim 3 wherein the coating is deposited by a process selected from the group consisting of plasma spraying, chemical vapour deposition, physical vapour deposition, welding, electroless plating and electrolytic plating.

5. A structure material for a water-cooled nuclear reactor comprising metal piping, said metal piping having a surface exposed to an aqueous liquid containing hydrogen peroxide, the structure material comprising a coating, the coating comprising matter selected from the group consisting of manganese, cadmium, oxides thereof, chemical compounds thereof and mixtures thereof, said coating being sufficient for effecting and causing decomposition of said hydrogen peroxide in said aqueous liquid.

6. The structure material for a nuclear reactor as claimed in claim 5 wherein said metal piping is comprised of alloys selected from the group consisting of carbon steel, alloy steel, zirconium, stainless steel, nickel-based alloys, cobalt-based alloys and mixtures thereof.

7. The reactor as claimed in claim 6 wherein said matter of said coating is capable of adsorbing said hydrogen peroxide.

8. The reactor as claimed in claim 7 wherein said piping surface coating is deposited by a process selected from the group consisting of plasma spraying, chemical vapour deposition, physical vapour deposition, welding, electroless plating and electrolytic plating.

9. A method for lowering the electrochemical corrosion potential of a metal alloy for use in a cooling tube in a water-cooled nuclear reactor having a surface exposed to an aqueous liquid containing hydrogen peroxide, comprising the step of coating said surface with matter selected from the group consisting manganese, copper, cadmium, oxides thereof, chemical compounds thereof and mixtures thereof, said coating being sufficient for effecting and causing decomposition of said hydrogen peroxide.

10. The method as claimed in claim 9 wherein said metal alloy is selected from the group consisting of carbon steel, alloy steel, stainless steel, zirconium nickel-based alloys, and cobalt-based alloys and mixtures thereof.

11. The method as claimed in claim 10 wherein said matter is capable of adsorbing said hydrogen peroxide in said liquid.

12. The method as claimed in claim 11 wherein said matter is deposited by a process selected from the group consisting of plasma spraying, chemical vapour deposition, physical vapour deposition, welding, electroless plating, electrolytic plating and mixtures thereof.

* * * * *